United States Patent

[11] 3,629,622

[72] Inventor David Denenberg, Jr.
   Mendon, Mass.
[21] Appl. No. 25,411
[22] Filed Apr. 3, 1970
[45] Patented Dec. 21, 1971
[73] Assignee Sylvania Electric Products Inc.

[54] SWITCHING REGULATOR HAVING A LOW DISSIPATION CURRENT OVERLOAD DETECTION DEVICE
2 Claims, 1 Drawing Fig.

[52] U.S. Cl. ................................................. 307/297,
   323/22 T, 307/251, 307/293
[51] Int. Cl. ........................................................... G05f 1/40
[50] Field of Search ............................................. 307/297,
   251, 293; 323/9, 18, 20, 22 T

[56] References Cited
UNITED STATES PATENTS

| | | | | |
|---|---|---|---|---|
| 3,396,326 | 8/1968 | Kisrow | | 323/20 |
| 3,264,550 | 8/1966 | Paice | | 323/9 |
| 3,538,426 | 11/1970 | Jones | | 323/9 |
| 3,366,871 | 1/1968 | Connor | | 323/9 |
| 3,480,852 | 11/1969 | Hung | | 323/20 |
| 3,409,821 | 11/1968 | Bingley | | 323/20 |

Primary Examiner—Donald D. Forrer
Assistant Examiner—Harold A. Dixon
Attorneys—Norman J. O'Malley, Elmer J. Nealon and Robert T. Orner ABSTRACT: A switching regulator employs between a primary power source and a switching transistor a sensing circuit which senses the current being drawn through the switching transistor by a load. A storage filter circuit having a large series inductance is connected between the load and the switching transistor. A feedback network is connected between the output connection of the storage filter circuit and the switching transistor to activate the switching transistor when the output voltage falls below a predetermined value and to inactivate the switching transistor when the output voltage exceeds a predetermined reference value. The sensing means which senses gradual overloads and a timing circuit which senses abrupt overloads are coupled to the switching transistor via a threshold circuit which compares the output signals from the sensing means and the timing circuits to a predetermined threshold level. When either of the output signals exceeds the threshold level, the switching transistor is opened interrupting the current from the primary power source.

PATENTED DEC 21 1971
3,629,622
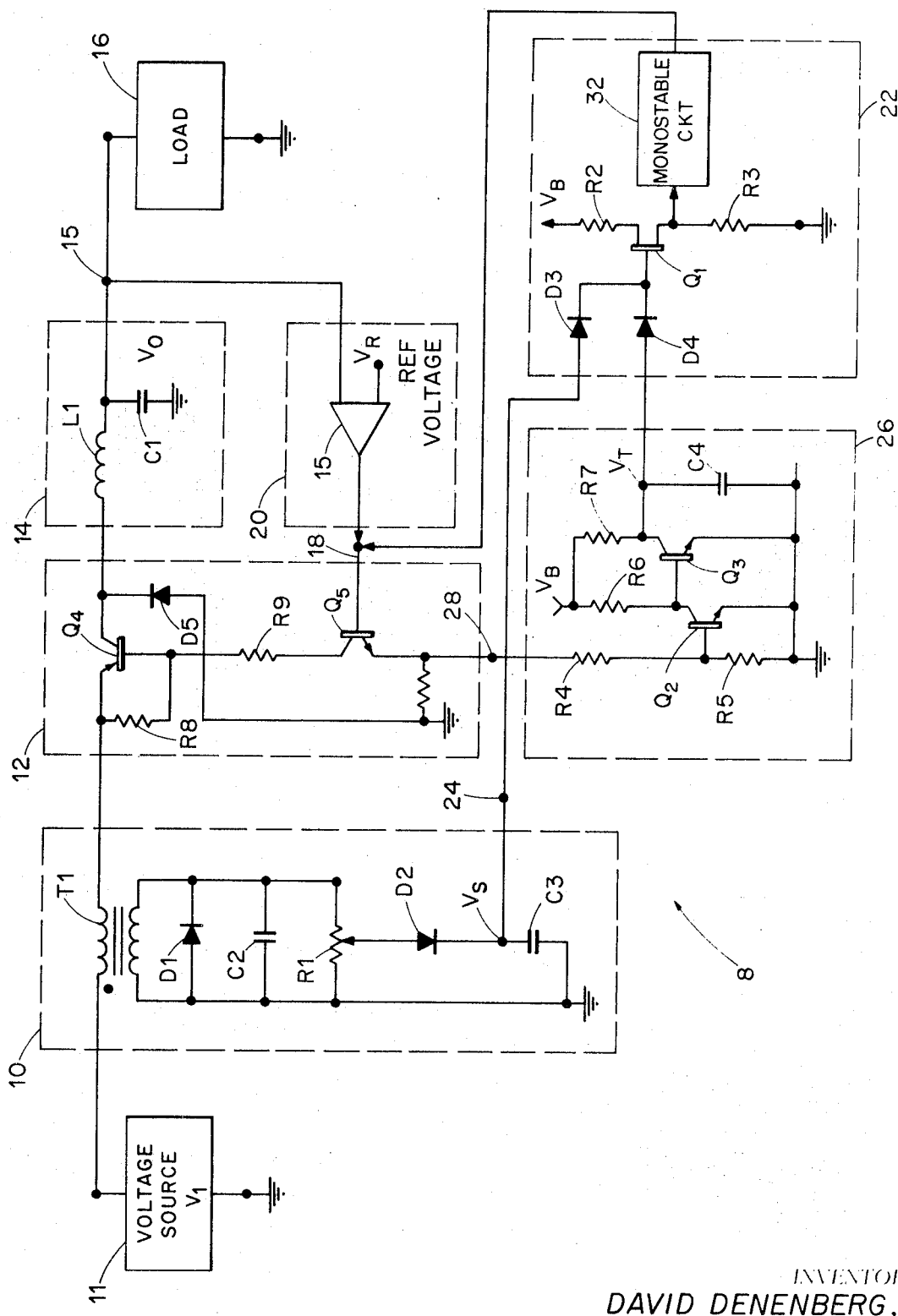
INVENTOR
DAVID DENENBERG, JR.
BY Robert T. Omer
ATTORNEY

SWITCHING REGULATOR HAVING A LOW DISSIPATION CURRENT OVERLOAD DETECTION DEVICE

BACKGROUND OF THE INVENTION

This invention relates to switching regulators and in particular to switching regulators having overload current protection circuitry associated therewith.

Conventional current overload detection circuitry employs dissipative sensors, for example, resistors, in series with the output load of the switching regulator system. A voltage-sensing device then determines the voltage generated across the sensor by the load current. When the voltage exceeds a preset threshold, the load current is interrupted. One disadvantage of the conventional circuitry is the high power dissipation (low efficiency) in the sensor since several hundred multivolts at the output current level are usually required across the sensor to establish a reliable threshold. The problem of low efficiency is particularly evident in low-voltage, high-current power supplies. It would, therefore, be advantageous to have and it is one of the objects of this invention to provide a switching regulator with overload protection circuitry having increased efficiency.

BRIEF DESCRIPTION OF THE INVENTION

A switching regulator having current overload protection circuitry according to the present invention includes a sensing means having a reactive sensing element coupled in series with a direct current energy source and an output terminal being operative to generate an output signal proportional to the current being drawn from the voltage source through the output terminal. A switching means having a control connection is coupled in series with the sensing means and a storage filter means and is operative in response to a first signal at the control connection to connect the voltage source to the filter storage means to thereby transfer current from the voltage source to the storage filter means. The switching means is operative to a second signal at the control connection to interrupt the flow of current from the voltage source to the storage filter means.

A feedback means is coupled between the output terminal of the switching regulator and the control connection of the switching means and is operative to provide the first signal to the control connection of said switching means when the output voltage at the output terminal falls below a predetermined level to thereby connect the storage filter means to the direct current energy source. When the output voltage at the output terminal exceeds a predetermined value, the second signal is directed to the control connection opening the switching means and thereby interrupting the flow of current to the storage filter means. The storage filter means supplies uninterrupted current to a load connected to the output terminal of the switching regulator and is periodically charged by the voltage source when the means is closed.

To prevent the regulator circuit from gradually exceeding a predetermined load current, a threshold means monitors the sensing means output voltage (which is proportional to the load current) and generates a signal to open the switching means when the sensing means output voltage exceeds the threshold value of the threshold means. A timing means having an input connection coupled to the switching means and an output connection coupled to the threshold circuit generates a voltage proportional to the length of time the switching means is closed.

Thus, under normal operating conditions the sensing means having a reactive sensing element dissipates very little energy and during gradual overload conditions generates a signal which opens the switching means thus disconnecting the regulator circuit and its load from the direct current energy source. Under short circuit conditions, a timing circuit senses the length of time the switching means is closed and generates an increasing voltage proportional to the length of time the switching means is closed. When the increasing voltage exceeds the threshold value of the threshold means, the switching means is opened disconnecting the regulator and the load from the voltage source.

DESCRIPTION OF THE DRAWINGS

The construction and operation of the invention will be more fully understood from the following detailed description in which the single FIGURE is a schematic diagram of a current overload protection circuit for a switching regulator according to the present invention.

DETAILED DESCRIPTION OF THE INVENTION

An embodiment of a switching regulator 8 having low dissipation current overload protection according to the present invention is shown in schematic form in the FIGURE and includes a sensing means such as the sensing circuit 10 having a reactive sensing element such as a transformer T1 (by using a reactive sensing element such as a transformer with a high turns ratio, low power dissipation is achieved). The primary winding of the transformer T1 is connected between a voltage source 11 and a switching means such as the switching circuit 12, the output of which is connected to a storage filter means such as the filter 14, for example, a series-connected inductor L1 and a capacitor C1. Connected to the common juncture of the inductor L1 and capacitor C1 is the switching regulator output terminal 15. Also connected to the output terminal 15 is a load 16 and a feedback means 20 which includes a comparator circuit 15. The output connection of the feedback means 20 is connected to the control connection 18 of the switching circuit 12.

Also connected to the control connection 18 of the switching circuit 12 is the output connection of a threshold means such as the threshold circuit 22 which has a first input connection from the output connection 24 of the sensing circuit 10 and a second input connection from a timing circuit 26. The timing circuit has an input connection connected to a terminal 28 of the switching circuit 12.

In operation, the switching circuit 12 is closed, and current flows from the voltage source 11 through the primary winding of transformer T1 and the switching circuit 12 to the inductor L1 of the filter 14. When the voltage $V_o$ across the first capacitor C1 and the load 16 reaches a level greater than the reference voltage level $V_R$ of the comparator 15, the feedback means 20 directs to the control connection 18 a signal which opens the switching means and interrupts the current flow between the voltage source 11 and the inductor L1. The inductor L1 continues to furnish current to the load 16 until the output voltage $V_o$ drops below the reference voltage $V_R$ of the comparator 15. The feedback means 20 then directs a signal to the control connection 18 causing the switching circuit 12 to close and current to flow from the voltage source 11 to the inductor L1 via the transformer T1.

The off-on action of the switching circuit 12 causes pulses of current to be coupled across the transformer T1 which has a high turns ratio to a filtering circuit comprising a parallel combination of a first diode D1 and second capacitor C2 and a center-tapped resistor R1. The center tap is connected through a rectifying diode D2 to a third capacitor C3. The terminal 24 of the sensing circuit 10 is connected to the common juncture of the rectifying diode D2 and the third capacitor C3. The pulsating signal across the secondary winding is filtered and stored in the capacitor C2. A portion of the filtered voltage is directed to the capacitor C3 and constitutes the sensing circuit output signal voltage $V_S$. The value of the signal voltage $V_S$, which is a function of the magnitude of the current pulse, is adjusted by adjusting the center tap of the resistor R1. As the current pulses increase in amplitude due to increase in the load current, the rectified voltage $V_S$ increases until it exceeds a predetermined threshold level in the threshold circuit 22.

The threshold circuit 22 includes a second isolating diode D3 connected to the gate element of a field effect transistor such as the unijunction transistor $Q_1$. The predetermined threshold referred to hereinabove is the firing point of the transistor $Q_1$ as set by the biasing resistors R2 and R3 and a bias supply voltage $V_B$. The output signal of the unijunction transistor $Q_1$, as taken, for example, across the resistor R3, is directed to a monostable circuit 32, the output of which is connected to the control connection 18 of the switching circuit 12. When the output signal voltage $V_S$ of the sensing circuit 10 exceeds the bias level set by resistors R1 and R2, the unijunction transistor $Q_1$ fires triggering the monostable circuit 32. The monostable circuit 32 in turn directs a signal to the control connection of the switching circuit 12 to thereby interrupt the current flow from the voltage source 11 to the inductor L1 until the load current falls within a safe level.

In the event of a short circuit, the voltage $V_o$ drops to substantially zero volts and the feedback means 20 closes the switching circuit 12 causing a steady current to flow through the transformer T1. Since the transformer current is not turned off and on by the switching circuit 12, the signal voltage $V_S$ does not reach a sufficient magnitude to overcome the threshold level of the threshold circuit 22 to thereby open the switching circuit 12.

To protect the regulator circuit 8 against a short circuit condition, the timing circuit 26 generates a voltage proportional to the length of time the switching circuit 12 is closed. One embodiment of a timing circuit includes a pair of series-connected resistors R4 and R5, one end of which is connected to a source of reference potential, for example, ground, and the other end of which is coupled to the switching circuit 12. Connected to the common juncture of the resistors R4 and R5 is a pair of direct-coupled transistors $Q_2$ and $Q_3$, for example, a pair of NPN-transistors. The collectors of the transistors $Q_2$ and $Q_3$ are connected through respective resistors R6 and R7 to the supply voltage $V_B$, and the emitters are connected to ground. Connected between the collector of the transistor $Q_3$ and ground is a storage capacitor C4.

Assume for purposes of explanation that the signal level at the terminal 28 of the switching circuit 12 is positive when the switching circuit 12 is closed and is at ground potential when the switching circuit is opened. Under normal operating conditions, when the switching circuit is closed, the transistor $Q_2$ is turned on (saturated) and the transistor $Q_3$ is nonconducting. The storage capacitor C4 charges through the collector resistor R7 to a value determined by the length of time that the switching circuit 12 is closed. Therefore, the voltage $V_T$ across the storage capacitor C4 is a function of the length of time the switching circuit 12 is closed. When the switching means 12 is opened by the normal operation of the feedback means 20 (or by the combination of the sensing circuit 10 and the threshold circuit 22 under a gradual overload condition), terminal 28 is at ground potential and the transistor $Q_2$ is made nonconducting. The transistor $Q_3$ is then turned on discharging the storage capacitor C4.

In the event the load is short circuited, the output voltage $V_o$ goes to zero and the feedback means 20 generates the appropriate signal to close the switching circuit 12. Since voltage $V_o$ can never rise above the reference voltage $V_R$, the feedback means 20 cannot generate the appropriate signal at the control connection 18 to open the switching circuit 12. Since the switching circuit 12 is not opening and closing in a cyclic manner, no information is being sensed by the sensing circuit 10, and the voltage $V_S$ can not exceed the threshold level of the threshold circuit 22 to thereby open the switching circuit 12.

However, the transistor $Q_2$ is conducting allowing the storage capacitor voltage $V_T$ to approach the voltage $V_B$. When the voltage $V_T$ (directed to the gate electrode of the transistor $Q_1$ via the diode D4) exceeds the threshold level of the gate electrode of the transistor $Q_1$, the monostable circuit 32 is fired applying the correct polarity signal to open the switching circuit 12 and interrupt the current flow from the voltage source 11 to the load 16.

One embodiment of the switching circuit 12 includes a switching element, for example, a switching transistor $Q_4$, connected in series with the sensing circuit 10 and the inductor L1. A base discharge resistor R8 is connected between the base and emitter of the switching transistor $Q_4$, and a return diode D5 is connected between the collector of the switching transistor $Q_4$ and ground. A drive transistor $Q_5$ has its collector connected via a limiting resistor R9 to the base of the switching transistor $Q_4$ and its emitter connected to ground via the resistor R10 and to the terminal 28 of the switching circuit 12. The base of the driver transistor $Q_5$ is connected to the control connection 18 of the switching circuit 12.

When the regulator output voltage $V_o$ across the capacitor C1 is below the reference voltage $V_R$, the feedback means 20 generates a positive voltage turning on the driver transistor $Q_5$ which in turn turns on the switching transistor $Q_4$ transferring current from the voltage source to the storage inductor L1. When the magnitude of output voltage $V_o$ exceeds the magnitude of the feedback reference voltage $V_R$, the positive signal is removed from the control connection 18 (the base of the drive transistor $Q_5$) turning off the switching transistor $Q_4$. The storage inductor L1 continues to furnish the load current via the return diode D5.

What is shown and described herein is a preferred embodiment of a switching regulator system including a highly efficient overload protection circuit employing a reactive sensing element. Various modifications and changes may be made therein without departing from the invention as defined by the appended claims. Such modifications may include positioning the sensing circuit between the switching circuit 12 and the filter 14 or between the output terminal 15 and the filter 14.

What is claimed is:

1. A switching regulator comprising:
   a direct current energy source;
   an output terminal;
   storage filter means coupled in series with said direct current energy source and said output terminal and being operative to store and supply current to a load connected to said output terminal;
   switching means coupled between said direct current energy source and said storage filter means and having a control connection and being operative in response to a first signal at said control connection to provide a low-impedance path between said direct current energy source and said storage filter means and being operative in response to a second signal at said control connection to provide a high impedance between said direct current energy source and said storage filter means to thereby interrupt the flow of current from said direct current energy source and said storage filter means;
   feedback means having an input connection connected to said output terminal and an output connection connected to the control connection of said switching means and being operative to generate said first signal at the control connection of said switching means when the voltage at said output terminal decreases below a predetermined value and to generate said second signal when the voltage at said output terminal increases above said predetermined value;
   sensing means coupled in series with said direct current energy source and said output terminal and having a voltage output terminal, said sensing means being operative to generate at its voltage output terminal a signal, the magnitude of which is proportional to the current passing between said direct current energy source and the output terminal of said switching regulator;
   threshold means having an input connection connected to the voltage output terminal of said sensing means and an output connection coupled to the control connection of said switching means and being operative to generate said second predetermined signal at said control connection when the magnitude of the signal at the voltage output terminal of said sensing means exceeds a predetermined threshold level; and timing means coupled between said switching means and said threshold means and being operative to generate a signal voltage proportional to the length of time said switching means is closed, said threshold means including
- a field effect transistor, the gate of which is connected to said sensing means and said timing means and the source and drain of which are coupled, respectively, to a supply voltage and a source of reference potential to thereby set a predetermined threshold level at said gate, said field effect transistor being operative in response to a predetermined signal at said gate to generate an output signal, and
- a monostable circuit having an input connection coupled to said field effect transistor and an output connection coupled to the control connection of said switching means and being operative in response to the output signal from said field effect transistor to generate said second signal at said control connection of said switching means to thereby open said switching transistor device when the predetermined threshold of said field effect transistor is exceeded.

2. A switching regulator according to claim 1 wherein said timing means comprises:
- a pair of series-connected resistors having one end connected to said driver transistor and the other end connected to a source of reference potential;
- a first and second resistor each having one end connected to a source of voltage;
- a first transistor having its base connected to the common juncture of said pair of series-connected resistors, its collector connected to the other end of said first resistor and its emitter connected to a source of reference potential and being operative to conduct when a predetermined voltage is present at the common juncture of said pair of series connected resistors;
- a second transistor having its base connected to the collector of said first transistor, its collector connected to the other end of said second resistor and its emitter connected to the source of reference potential, and being operative to conduct when said first transistor is nonconducting and to be nonconducting when said first transistor is conducting; and
- a capacitor having one end connected to the collector of said second transistor and to said threshold means and the other end connected to a source of reference potential, said capacitor being operative to charge toward a predetermined level when said second transistor is nonconducting and to discharge when said second transistor is conducting.

* * * * *